(12) United States Patent
Ruffa et al.

(10) Patent No.: US 6,997,603 B2
(45) Date of Patent: Feb. 14, 2006

(54) INSTRUMENTED FIBER OPTIC TOW CABLE

(75) Inventors: Anthony A. Ruffa, Hope Valley, RI (US); Thomas R. Stottlemyer, Mystic, CT (US); Peter E. Seaman, Niantic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/814,487

(22) Filed: Mar. 20, 2001

(65) Prior Publication Data
US 2004/0208224 A1    Oct. 21, 2004

(51) Int. Cl.
*G01K 3/00* (2006.01)
*G01K 11/00* (2006.01)
*G02B 6/44* (2006.01)

(52) U.S. Cl. ............... 374/137; 374/161; 374/131; 385/107; 385/100

(58) Field of Classification Search ............ 374/137, 374/161, 141, 131; 385/106, 107, 105, 102, 385/103, 100, 101, 147
See application file for complete search history.

(56) References Cited

U.S. PATENT DOCUMENTS

| | | | |
|---|---|---|---|
| 3,938,385 A * | 2/1976 | Horwath | 374/137 |
| 5,198,662 A * | 3/1993 | Yamaguchi et al. | 374/137 |
| 5,212,755 A * | 5/1993 | Holmberg | 385/107 |
| 5,217,306 A * | 6/1993 | Wada | 374/137 |
| 5,449,233 A * | 9/1995 | Sai et al. | 374/137 |
| 6,072,928 A * | 6/2000 | Ruffa | 385/100 |
| 6,147,931 A * | 11/2000 | Seaman et al. | 374/137 |
| 6,195,488 B1 * | 2/2001 | Song | 385/101 |
| 6,205,276 B1 * | 3/2001 | Anelli et al. | 385/100 |
| 6,542,228 B1 * | 4/2003 | Hartog | 385/12 |
| 6,591,046 B2 * | 7/2003 | Stottlemyer | 385/103 |
| 2002/0085819 A1 * | 7/2002 | Stottlemyer et al. | 385/104 |

FOREIGN PATENT DOCUMENTS

| | | | | |
|---|---|---|---|---|
| JP | 02135615 A | * | 5/1990 | |
| JP | 06148001 A | * | 5/1994 | |
| JP | 06221932 A | * | 8/1994 | |

* cited by examiner

*Primary Examiner*—Gail Verbitsky
*Assistant Examiner*—Mirellys Jagan
(74) *Attorney, Agent, or Firm*—James M. Kasischke; Jean-Paul A. Nasser; Michael P. Stanley

(57) ABSTRACT

An integrated fiber-optic tow cable is described having both optical fibers and armor wires located outside the cable core to avoid high strain on the optical fibers when the cables is under stress during deployment. The optical fibers have integral temperature sensors near the outermost portion in order to measure accurately the temperature of the fluid coming in contact with temperature sensors. A beam of light is shown on the optical fibers which is reflected by the optical fibers and reaches the receiver and processed by the processor which may also include a display unit.

10 Claims, 1 Drawing Sheet

INSTRUMENTED FIBER OPTIC TOW CABLE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1). Field of the Invention

The instant invention relates to an instrumented cable using optical fiber for many types of measurements, and more particularly to measure the temperature profile of a body of water as a function of depth using an instrumented fiber optic tow cable and to measure a temperature profile for oil wells.

(2). Description of the Prior Art

There are several approaches for measuring temperature with fiber-optic-based sensors that are already available in the prior art. However, one of the main obstacles of using this technique is to design a system that is sufficiently rugged to survive deployment and retrieval through handling systems at high tensions over a limited diameter sheave or a winch. Nonetheless, the use of optical fibers to measure various physical parameters such as light transmission in different media is on the increase due to the compact size and the ease of operation of optical fiber detectors in various environments. As an example, use of optical fibers to measure the temperature profile of a body of water as a function of depth is quite important as the water temperature affects the propagation of acoustic waves in the body of water and thus affects sonar performance. The temperature of the water is also important to the fishing industry, because some species of fish stay within water having very precise temperature bounds. Still another area of interest is to measure temperature profile in an oil well. It is thus desirable to integrate an optical fiber tow cable as a detector for making measurements of various parameters including temperature profile of a body of water and/or and oil well using a state-of-the art tow cable with optical fibers.

SUMMARY OF THE INVENTION

In accordance with the principal object of the present invention, an armored fiber optic cable is integrated with the means for measuring temperature of a body of water and/or obtaining temperature profile in an oil well. In the fiber optic tow cable, a plurality of optical fibers enclosed in tubes are interspersed among the armor wires comprising either a typical double-plow steel wire or KEVLAR™ fiber tow cable as taught by Holmberg in U.S. Pat. No. 5,212,755; dated 18 May 1993, assigned to the United States of America as represented by the Secretary of the Navy. A series of temperatures sensors are incorporated into the optical fibers integrated in the tow cable. This patent is incorporated by reference in subject patent application. Subject invention further teaches the use of a light source which illuminates on the optical fibers used and the scattered light is received by a receiver which sends the signals for processing in a processor to obtain temperature profile of the body of water or that of an oil well as a function of depth.

It is an object of subject invention to integrate fiber optic sensors into a state-of-the-art tow cable.

Still another object of subject invention is to use temperature sensors in conjunction with the optical fibers to measure a temperature profile of a body of water.

Still another object of subject invention is to use an instrumented tow cable to measure a temperature profile of an oil well.

Another object of subject invention is to use steel armor wires to protect the optical fibers used in the system.

Another object of subject invention is to use KEVLAR™ fibers or wires to protect the optical fibers used in the system for measuring temperature profile.

Still another object of subject invention is to use the optical fibers fitted with temperature sensors in the outer most layer wherein either armor steel wires or armor KEVLAR™ fibers are used as armor wires.

Other objects features and advantages of the invention shall become apparent as the description thereof proceeds when considered in connection with accompanying illustrative drawings.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein.

DESCRIPTION OF THE PREFERRED EMBODIMENT

Figure 1:
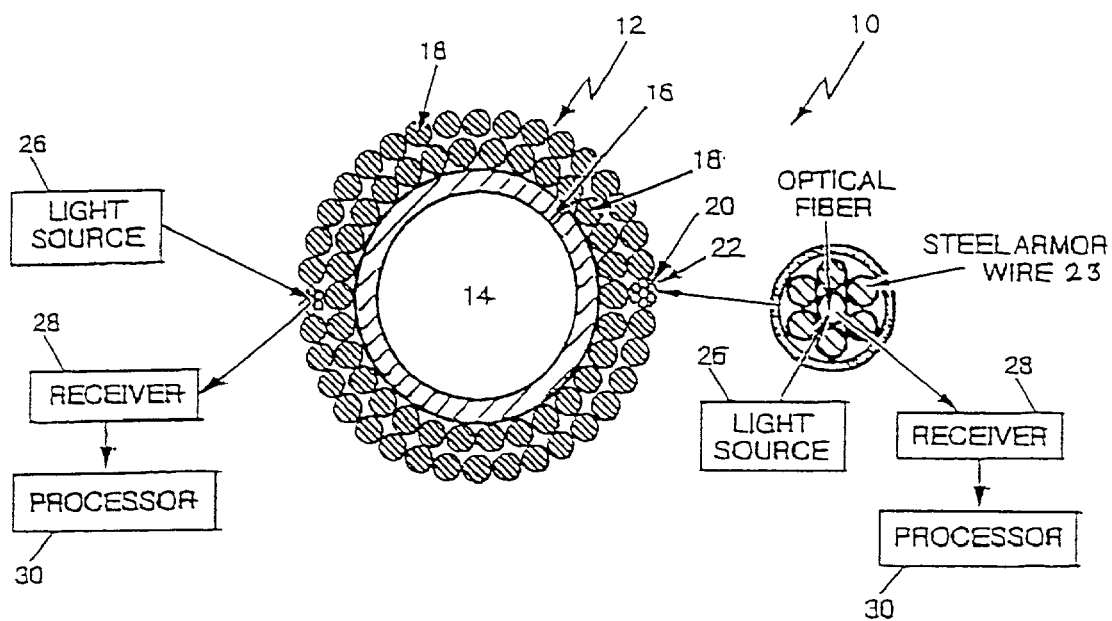
FIG. 1 is a diagrammatic representation of an integrated tow cable which uses armor steel wires.

Referring now to FIG. 1, a first embodiment of an instrumented fiber optic tow cable system 10 according to the teachings of subject invention is diagrammatically shown which includes a steel armored, low strain fiber optic cable 12. Here, low strain is defined as an amount of strain that is sufficiently small so that the optical fibers are not strained to the point of damage. Cable 12 is made of a cable core 14 which may also contain electrical conductors (not shown) to carry electric power and signals, a core jacket 16 to prevent water intrusion into the cable core 14, armor wires 18, arranged in one or more layers, and optical fibers 20 interspersed in the outermost layer to expose the optical fibers 20 to the temperature of the fluid under investigation. It should be noted that the temperature sensors (not shown) are attached integrally to optical fibers 20.

Figure 2:
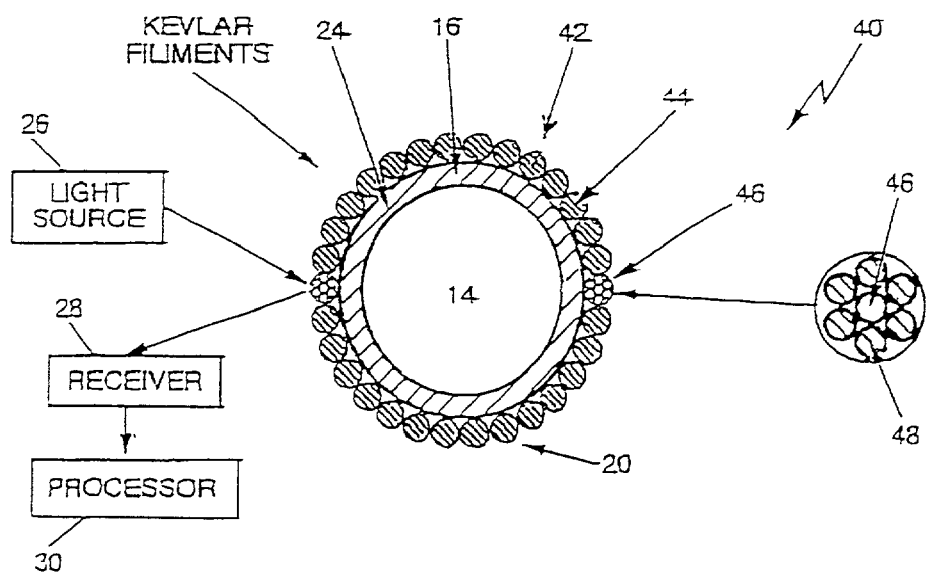
FIG. 2 is another diagrammatic representation of an integrated tow cable which uses armor KEVLAR™ fibers.

It should also be noted that in embodiment 1 as shown in FIG. 1, optical fibers 20 are enclosed in preferably steel tubes 22. The method of enclosing optical fibers in stainless steel tubes is standard in the telecommunications industry. The stainless steel tube 22 replaces one armor wire 18, and thus has a diameter equal to or less than that of the replaced armor wire 18. Alternatively, as shown in FIG. 1, in order to preserve their integrity, the optical fibers 20 are surrounded by preferably steel armor wires 23 of smaller diameter than that of armor wires 18. The bundle of steel armor wires 23 replaces an armor wire 18 and has a diameter equal to or less than the replaced armor wire 18. A KEVLAR™ braided fiber-based sleeve (not shown) may be placed around the outer layer of the bundle of steel armor wires 23 to keep them together as one unit. Alternatively, as shown in FIG. 1, the optical fiber 20 is surrounded by the bundle of steel armor wires 23, which in turn is enclosed in steel tube 22 having a diameter equal to or less than an armor wire 18 to keep the bundle of steel armor wires 23 together as one unit. The method disclosed here is distinguished from the Holmberg patent in that the optical fiber is located in the outer armor wire layer. The scattered light is received by receiver 28 and processed by processor 30 to obtain the information about the temperature of the fluid at a particular location. The preferred method is to make use of Raman scattering effects to infer the distributed temperature along the fiber. It is established in the prior art that such methods can provide a distributed measurement with ½ meter resolution along the fiber. In Instrumented Tow Cable tests, the measurements differed from XBT (Expendable Bathythermograph) measurements by 0.2° C. (standard deviation) or less. It should be noted that the KEVLAR™ braid allows the water or the fluid under investigation to impinge on the optical fibers and the temperature detectors to measure the true temperature at a particular location. It should also be noted that processor 30 used for this analysis is a PC (personal computer) based system and is commercially available and it may also include a display unit (not shown). The second embodiment of the integrated fiber optic tow cable system 40 is shown in FIG. 2 which uses tow cable 42 which has a plurality of armor KEVLAR™ fibers 44, having optical fibers 46. Surrounded by KEVLAR™ fibers 48 as shown. The processing is done by using a light source 26, a receiver 28 and a processor 30. It should be noted that the optical fibers can be enclosed in steel tubes to preserve their integrity instead of surrounding them by armor wires. Although only one optical fiber is needed for operation of the instrumented cable, in practice, more than one optical fiber (enclosed in a steel tube or in a bundle of smaller armor wires) is incorporated into the outer layer of armor wires for redundancy.

It should be noted that the inventive concept of subject invention is the concept of integration of optical fibers with the system of measuring the temperatures at various depths of a fluid. The system of measuring the temperatures using a light source, a receiver and a processor can be varied without deviating from the teachings of subject invention.

Another preferred method for measuring temperature is via Raman scattering coupled with an adaptation of Optical Time Domain Reflectometry (OTDR). This provides a direct measurement of the temperature over cells determined by a type of time of arrival processing of the scattered energy.

While there is shown and described herein certain specific structure embodying the invention, it will be manifested to those skilled in the art that various modifications and rearrangements of the parts may be made without departing from the spirit and scope of the underlying inventive concept. As an example, armor wires could be either steel wires or KEVLAR™ fibers. Furthermore, the system for measuring the temperature of the fluid as a function of depth of a fluid using a light source, a receiver and a processor can be varied without deviating from the teachings of subject invention except insofar are indicated by the scope of the appended claims.

What is claimed is:

1. An instrumented fiber optic tow cable system for measuring a temperature profile of a fluid, which comprises:
   a low strain cable having a core, said core having an interior and an exterior;
   a jacket concentric with and in contact with the exterior of said core, said jacket having an exterior;
   a plurality of first armor wires radially spaced around and in contact with the exterior of said jacket and defining at least one radially located layer circumferentially concentric with said jacket;
   a plurality of optical fibers spaced around the exterior of said jacket interspersed among said plurality of armor wires in the outermost radially located layer of first said at least one radially located layer of said plurality of armor wires to expose the optical fibers to the temperature of said fluid, wherein each of said plurality of optical fibers is surrounded by a plurality of steel armor wires of smaller diameter than that of said plurality of first armor wires;
   a light source arranged to send light signals to said plurality of optical fibers, which scatter said light signals according to the temperature profile of said fluid;
   receiver means for receiving the scattered light signals from said plurality of optical fibers; and
   processing means for analyzing said scattered light signals received by said receiver means to determine a temperature profile of said fluid.

2. The instrumented fiber optic tow cable system of claim 1 wherein said processing means includes a display unit for getting a visual presentation of said temperature profile.

3. The instrumented fiber optic tow cable system of claim 1 wherein said plurality of first armor wires are steel wires.

4. The instrumented fiber optic tow cable system of claim 1 wherein said plurality of first armor wires are KEVLAR™ fibers.

5. The instrumented fiber optic tow cable system of claim 1 wherein Raman scattering effects are used to infer the temperature of the plurality of optical fibers.

6. The instrumented fiber optic tow cable system of claim 1, wherein each of said plurality of optical fibers surrounded by a plurality of steel armor wires is in turn enclosed in a steel tube having a diameter that is less than or equal to the diameter of the plurality of first armor wires.

7. The instrumented fiber optic tow cable system of claim 1 wherein each of said plurality of optical fibers surrounded by a plurality of steel armor wires of smaller diameter than that of said plurality of first armor wires is in turn enclosed in a steel tube to keep said plurality of steel armor wires of smaller diameter together as one unit.

8. The instrumented fiber optic tow cable system of claim 1 wherein each of said plurality of optical fibers surrounded by a plurality of steel armor wires of smaller diameter than that of said plurality of first armor wires is in turn enclosed in a KEVLAR™ braided fiber-based sleeve to keep said plurality of steel armor wires of smaller diameter together as one unit.

9. The instrumented fiber optic tow cable system of claim 1 wherein the processing means makes use of Raman scattering.

10. The instrumented fiber optic cable system of claim 9 wherein said processing means also uses Optical Time Domain Reflectometry (OTDR).

* * * * *